United States Patent
Heurguier

(10) Patent No.: US 9,325,453 B2
(45) Date of Patent: Apr. 26, 2016

(54) METHOD FOR CHARACTERIZING AT LEAST ONE SIGNAL SOURCE

(71) Applicant: THALES, Neuilly sur Seine (FR)

(72) Inventor: Dominique Heurguier, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 6 days.

(21) Appl. No.: 14/480,369

(22) Filed: Sep. 8, 2014

(65) Prior Publication Data

US 2015/0074497 A1    Mar. 12, 2015

(30) Foreign Application Priority Data

Sep. 9, 2013    (FR) ..................................... 13 02093

(51) Int. Cl.
*H03M 13/00* (2006.01)
*H04L 1/00* (2006.01)
*G01S 5/20* (2006.01)

(52) U.S. Cl.
CPC .................. *H04L 1/0084* (2013.01); *G01S 5/20* (2013.01)

(58) Field of Classification Search
CPC ..... H04L 1/0084; H04L 41/069; H04L 67/12; G01S 5/20; G01S 19/23; G01S 19/48; G01S 3/74; G01S 13/345; G01S 13/584; G01S 13/931; G06F 17/00; G07C 5/008; G07C 5/0808; H01Q 3/267; G01C 21/26; G08G 1/127
See application file for complete search history.

(56) References Cited

U.S. PATENT DOCUMENTS

| 8,144,057 | B1 | 3/2012 | Minkoff |
| 8,175,851 | B1 | 5/2012 | Francis et al. |
| 2010/0283666 | A1 | 11/2010 | Lee et al. |

FOREIGN PATENT DOCUMENTS

EP    2605420 A1    6/2013

OTHER PUBLICATIONS

Lee, et al., Angle-of-Arrival Estimation for UWB Signals Clustered in Angle, 2006 $1^{st}$ International Symposium on Wireless Pervasive Computing, Jan. 1, 2006, pp. 1-4.
Reed, et al., Multiple-source localization using line-of-bearing measurements: Approaches to the data association problem, Military Communications Conference, 2008, MILCOM 2008, IEEE, Piscataway, NJ, USA, Nov. 16, 2008, pp. 1-7.
Search Report dated Jul. 10, 2014 for French Patent Application No. 1302093 filed Sep. 9, 2013.

*Primary Examiner* — Guerrier Merant
(74) *Attorney, Agent, or Firm* — Knobbe, Martens, Olson & Bear, LLP

(57) ABSTRACT

A method for characterizing at least one signal source is disclosed. In one aspect, the method includes measuring, from a set of sensors, a set of technical data specific to the signals emitted by the signal source, grouping together the technical data in a set of classes depending on the correlations on the data and characterizing the signal source from technical data having been grouped together. The grouping step includes calculating correlations on the data n-tuples with n>2 and calculating a global partitioning error for different distributions of the data in classes. The global partitioning error is defined as a sum of the partitioning costs for all the n-tuples. The grouping further includes retaining as a grouping of data, the distribution in the classes minimizing the global partitioning error.

8 Claims, 3 Drawing Sheets

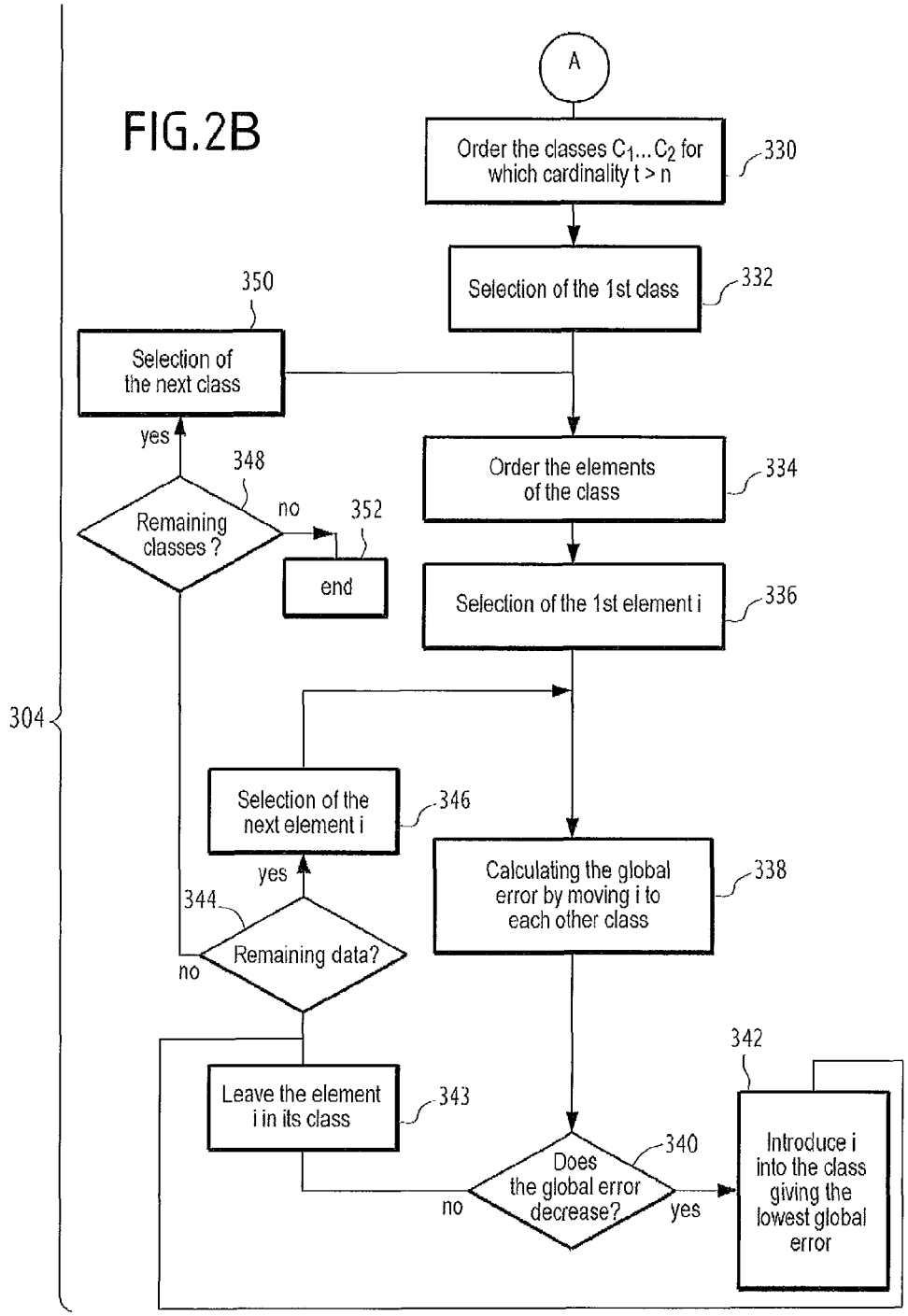

METHOD FOR CHARACTERIZING AT LEAST ONE SIGNAL SOURCE

CROSS-REFERENCE TO RELATED APPLICATIONS

This application claims benefit under 35 U.S.C. §119 of French Application No. 13 02093, filed Sep. 9, 2013, which is herein incorporated by reference in its entirety.

BACKGROUND OF THE INVENTION

1. Field of the Invention

The described technology relates to a method for characterizing at least one signal including the steps of: measuring, from a set of sensors, a set of technical data specific to the signals emitted by the source signal; grouping the technical data in a set of classes depending on the correlations on the data; and characterizing the signal source from technical data having been grouped together.

2. Description of the Related Art

Certain pieces of electronic equipment, such as goniometric equipment or radars produce data flows representative of technical elements which are in a very substantial amount. In order to ensure the processing of these data, it is often necessary to group these data in a certain number of classes characterizing the entities which are at the origin of these data (emitter, radar echo, etc.). The data are grouped in these classes depending on their proximity with regards to certain similarity criteria.

A widely used method for grouping data into different classes is relational analysis. This technique is based on the use of measuring similarity and on pairwise comparisons made among the data. The measurement of similarity is a value existing for each pair of data. This value is representative of the proximity of two data with regards to one or several criteria.

In certain situations, the similarity measurement for each of the pairs does not exist and only a correlation on n-tuples of data (n>2) is available.

Relational analysis then cannot be applied and the distribution of the data into the different classes is carried out with difficulty, except if ad hoc methods dedicated to the relevant problem are used.

For example, a <<multi-localization>> method is used for grouping goniometric measurements per emitter or further methods based on DTOA (Difference of Time of Arrival) for deinterlacing periodic pulse signals.

The necessity of defining an ad hoc process depending on the type of data to be processed for grouping together data per class is complex to apply and has a relatively high development cost.

SUMMARY OF CERTAIN INVENTIVE ASPECTS

An object of certain embodiments is to propose a general method for characterization per data class which may be of general use for characterizing a signal source.

For this purpose, an object of certain embodiments is a method for characterizing at least one signal source, wherein the grouping step comprises:

a) calculating correlations on data n-tuples with n>2;
b) calculating a global partitioning error for different distributions of the data in classes, the global error being defined as a sum, for all the n-tuples:
  of the partitioning costs $(1-c(i_1, \ldots ci_n))$ of an n-tuple in a same class if all the data of the n-tuple are in a same class, the partitioning cost $(1-c(i_1 \ldots i_n))$ in a same class being a decreasing function of the correlation of the n-tuple; and
  of the partitioning costs $(c(i_1, \ldots i_n))$ of an n-tuple in different classes when all the data of the n-tuple are not in a same class, the partitioning cost $(c(i_1 \ldots i_n))$ in different classes being an increasing function of the correlation of the n-tuple; and
c) retaining as a grouping of data the distribution in the classes minimizing the global error.

According to particular embodiments, the method includes one or more of the following features:

the partitioning cost in a same class is equal to 1 minus the correlation of the n-tuple $(1-c(i_1, \ldots i_n))$ and the partitioning cost in different classes is equal to the correlation of the n-tuple $(c(i_1 \ldots 1_n))$;
  the calculation of a global partitioning error for different distributions includes:
a1) an additional step for distributing the data in M classes;
a2) a step for displacement of the data among the classes with for each displacement the calculation of a global partitioning error;
  the initial distribution step includes the calculation of a consistency function among the data of a class and the selection, for generating a new class, of the data of the set with a maximum cardinality and the consistency function of which is greater than a predetermined threshold;
  the technical data are emission directions of signals intercepted from the signal source and the characterization of the signal source includes a step for estimating the position of the signal source by triangulation of the data of a same class for each source; and
  the technical data are pieces of time information characteristic of the intercepted signals from the signal source and the characterization of the signal source includes and a step for estimating the emission mode of each source from time information characteristic of a same class for each source.

Another object of certain embodiments is also a system for characterizing at least one signal source including:
  means for measuring, from a set of sensors, a set of technical data specific to the signals emitted by the signal source;
  means for grouping together technical data into a set of classes depending on the correlations on the data; and
  means for characterizing the signal source from the technical data having been grouped together;
wherein the grouping means comprise:
a) means for calculating correlations on data n-tuples n>2;
b) means for calculating a global partitioning error for different distributions of data in classes, the global error being defined as a sum, for all the n-tuples:
  of the partitioning costs $(1-c(i_1, \ldots ci_n))$ of an n-tuple in a same class if all the data of the n-tuple are in a same class, the partitioning cost $(1-c(i_1 \ldots i_n))$ in a same class being a decreasing function of the correlation of the n-tuple; and
  of the partitioning costs $(c(i_1, \ldots i_n))$ of an n-tuple in different classes when all the data of the n-tuple are not in a same class, the partitioning cost $(c(i_1, \ldots i_n))$ in different classes being an increasing function of the correlation of the n-tuple; and
c) means for retaining as a grouping of data the distribution in the classes minimizing the global error.

BRIEF DESCRIPTION OF THE DRAWINGS

The described technology will better understood upon reading the description which follows, only given as example and made with reference to the drawings wherein.

DETAILED DESCRIPTION OF CERTAIN ILLUSTRATIVE EMBODIMENTS

The described technology will now be described within the scope of localizing a set of emitters by goniometry.

Figure 1:
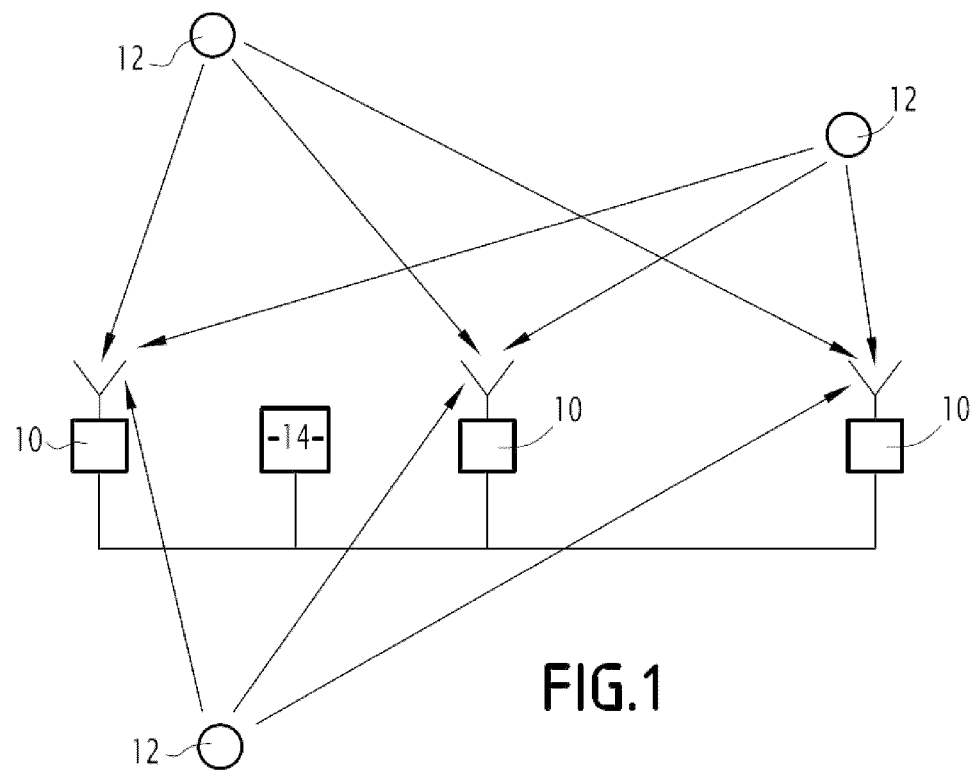
FIG. 1 is a schematic view illustrating signal sources and an installation for characterizing these sources according to an embodiment.

For this purpose, the system 8 illustrated in FIG. 1 includes several receivers 10 each provided with a suitable antenna. These receivers 10 are placed in an emission field of several emitters 12, the positions of which are sought.

Each receiver 10 is able to determine, for each signal received from an emitter, an azimuth giving the direction of the emitter from which the intercepted signal is emitted and an estimated standard deviation of this azimuth.

The installation further includes an information processing central unit 14 to which are connected the communication receivers by any suitable means for transmitting each azimuth and corresponding standard deviation.

The measured azimuths and the corresponding standard deviations are Gaussian measurements or data. They are stored in memory in a set $\Omega$ of data in the information processing unit 14.

The information processing unit 14 is able from the data set $\Omega$, to determine the most likely positions of the emitters 10 from calculations of correlations made on these data and from grouping these data in classes on the basis of these correlations.

Each class corresponds to an emitter and the position of the emitter is calculated by triangulation from the data of the class.

Within the scope, the data of the set $\Omega$ are Gaussian azimuth read-out measurements. They are defined by a measurement position and azimuth giving the direction of the intercepted emitter and an estimated standard deviation of this azimuth.

The correlation measurement is defined by any subset of data noted from $i_1$ to $i_p$ with a cardinality $p \geq 3$ by the following empirical variance:

If none of the azimuths intersect each other, $c\{i_1, i_2, \ldots, i_p\}=0$

Otherwise:

a localization $M\{i_1, i_2, \ldots, i_p\}$ is calculated corresponding to the p-tuple by a triangulation method, assuming that all the measurements comes from a single emitter. The localization is obtained for example by using an estimation method based on the maximum likelihood principle, a so-called Torrieri algorithm, well known to those skilled in the art.

The correlation of the p-tuple is calculated according to the following formula of the empirical variance:

$$c\{i_1, i_2, \ldots, i_p\} = 1 - \frac{1}{p\pi^2} \sum_{j=1}^{p} |i_j - \hat{i}_j|^2$$

wherein $\hat{i}_j$ is the theoretical azimuth of the j-th measurement associated with a position $M\{i_1, i_2, \ldots, i_p\}$ of the emitter.

Figure 2A:
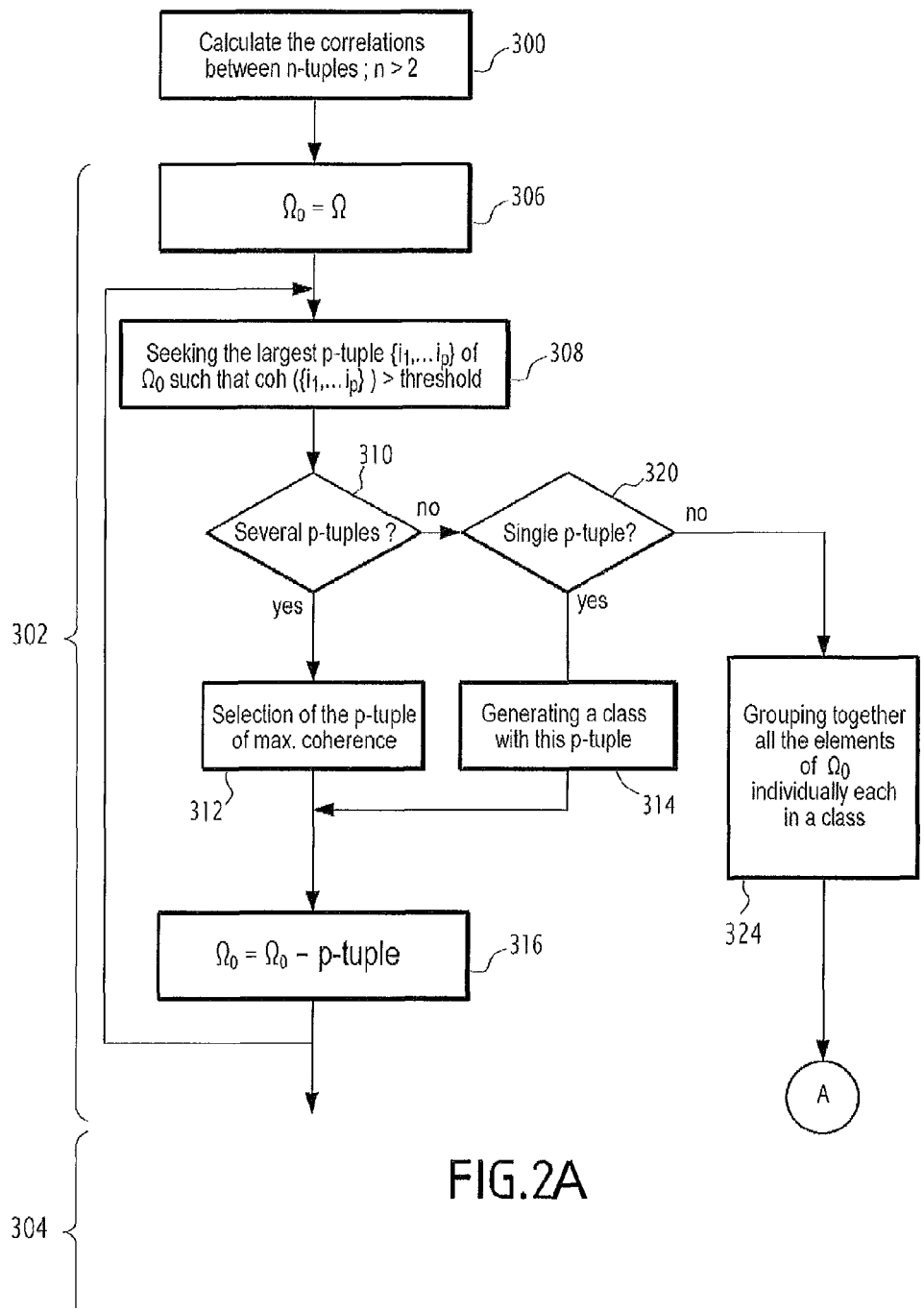
FIG. 2 is a flowchart of the grouping method as applied in an embodiment.

For characterizing the emission sources, and notably here the determination of their position, the method illustrated in FIG. 2 is applied by the unit 14.

In the initial step 300, the correlations between all the n-tuples of the whole of the elements are determined and are stored in a database. The correlation for the elements $\{i_1, i_2, \ldots i_n\}$ is noted as $c_{i_1,i_2,\ldots,i_n}$.

During an initial phase 302, the whole of the elements is distributed in classes and then the elements are redistributed in a second phase 304 among the classes for optimizing the grouping.

Figure 3:
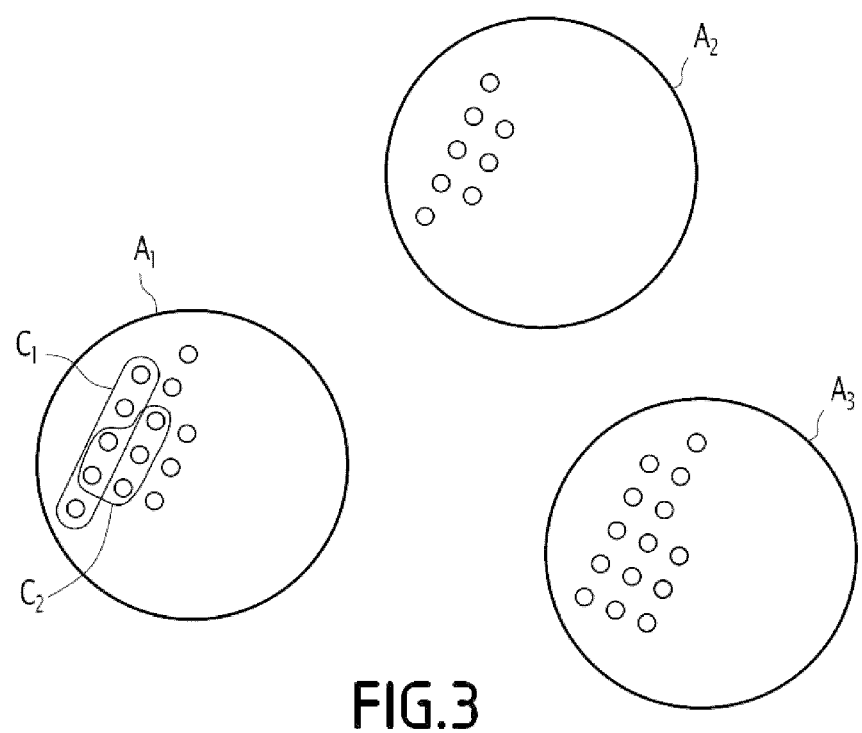
FIG. 3 is a schematic view illustrating the description of elements in several classes.

In FIG. 3, three classes noted as A1, A2 and A3, each including technical elements, are illustrated. Each element of a class is formed with one datum.

It is supposed in this example, that the correlation is known between the whole of these elements, for these elements taken 5 by 5. Thus, a correlation between the elements of each quintuplet of five elements, such as the quintuplets C1 and C2 illustrated in FIG. 1, is known. The correlation of each quintuplet is a real number comprised between 0 and 1.

Initially, in step 306, a set $\Omega_0$ of the elements remaining to be grouped in classes is assumed to be equal to the set $\Omega$ of all the elements.

In step 308, the largest p-tuple $[i_1, \ldots i_p]$ is sought in $\Omega_0$ such that: $\mathrm{Coh}(\{i_1 \ldots i_p\})>$threshold (condition 1). The value threshold is defined depending on the problem and is sufficiently small so that at least two p-tuples which meet condition 1 exist.

The coherence function noted as Coh( ) of a class A is defined by:

If the correlation function c is strictly defined on $\Omega^n$ with p>n:

$$\mathrm{Coh}(A) = \frac{1}{C_{|A|}^n} \sum_{\{i_1, i_2, \ldots, i_n\} \subset A} c_{i_1, i_2, \ldots, i_n} \quad i_1, i_2, \ldots, i_n \text{ being distinct}$$

If the correlation function is defined on $\Omega^p$ or on $$\bigcup_{p \geq n} \Omega^n$$

(i.e. for an n-tuple of any size):
the coherence function is directly given by applying the correlation function to the whole of the elements of the class:
$\mathrm{Coh}(A) = c\{i_1, i_2, \ldots, i_{|A|}\}$ où $A = \{i_1, i_2, \ldots, i_{|A|}\}$
with $c_{i_1,i_2,\ldots,i_n}$: the correlation of the elements $\{i_1, i_2, \ldots i_n\}$ and $|A|$ designates the cardinal of A Here, the coherence measurement $\mathrm{Coh}(A) = c\{i_1, i_2, \ldots, i_{|A|}\}$ of a subset A of elements $A = \{i_1, i_2, \ldots, i_{|A|}\}$ of cardinality $|A|=p \geq 3$ is directly defined by the measurement of correlation $c\{i_1, i_2, \ldots, i_p\}$ of the p-tuple.

If during the test conducted in step 310, several p-tuples with maximum cardinality meet condition 1, the p-tuple leading to maximum coherence is selected in step 312.

From this p-tuple, a $C_i$ is generated. It initially only contains the elements of this p-tuple.

In step 316, the set $\Omega_0$ of the elements to be grouped is reduced by the elements of the p-tuple assigned to the new generated class. Steps 308 and the following are again applied.

If a single p-tuple meets condition 1 of step 308 during a test carried out in step 320, then this p-tuple is used for generating a new class $c_i$ in step 314.

If no p-tuple is found as meeting the condition of step 308 during the test carried out in step 320, the whole of the remaining elements are placed in step 324, each individually in a new singleton class.

The optimization phase 304 is then applied.

Initially, the classes $C_i$ defined beforehand are ordered by increasing cardinality in step 330 and a first class of minimum cardinality is selected in step 332. The elements contained in the class are also ordered in step 334 arbitrarily and a first element is selected in step 336.

A global error Er(x) of the distribution among the classes is thus calculated in this state before any displacement of the element i. This global error of a partitioning X corresponds to the sum of the partitioning costs on all the n-tuples of distinct elements and is expressed in the form:

$$Er(X) = \sum_{i_1,i_2,...i_n \in \Omega^n} (c_{i_1,i_2,...i_n} x_{i_1,i_2,...i_n} + (1 - c_{i_1,i_2,...i_n}), x_{i_1,i_2,...i_n})$$

wherein $x_{i1,i2,...,in}=1$ if $\forall_j, i_j \in$ same class and 0 otherwise (i.e. if at least two elements $i_k$ and $i_l$ do not belong to the same class)

The partitioning cost for an n-tuple is given here by:
If $i_1, i_2, \ldots i_n \in$ same class $C_k$: cost=$1-c(i_1, i_2, \ldots i_n)$
If $i_1, i_2, \ldots i_n \in$ different classes: cost=$c(i_1, i_2, \ldots i_n)$
wherein $c_{i_1, i_2, \ldots i_n}$ is the correlation between the elements $\{i_1, i_2, \ldots i_n\}$ More generally, the partitioning cost is a decreasing function of the correlation of the n-tuples if all the elements of the n-tuple are in a same class and an increasing function if all the elements of the n-tuple are not in a same class.

The global error Er(X) is then calculated by displacing the selected element i in step 336 to each of the other classes.

In step 340, it is determined whether the global error Er(X) is lowered upon displacing the element i. If this is the case, the element i is introduced in step 342 into the class with which the smallest global error Er(X) may be obtained.

If the global error does not decrease, the element i is maintained in its initial class in step 343.

Next in step 344, it is then determined whether there remain elements i in the relevant class.

If this is the case, the following element is selected in step 346 and steps 338 and the following are again applied.

If this is not the case, in step 348, it is determined whether there remain classes which have not yet been covered. If this is the case, the following class is selected in step 350 and steps 338 and the following are again applied. If all the classes have been scanned, the algorithm is terminated in step 352.

By applying the algorithm, it is then possible to determine the classes of azimuths having a good correlation. Each of these classes is then assumed to correspond to a single emitter, and localization by triangulation is then applied for each class, for example with a maximum likelihood method, a so-called Torrieri algorithm.

By applying the general method, the list of the emitters at the origin of the goniometry measurements and their estimated localization are obtained.

It is realized that with such an algorithm, the generated classes initially are relatively coherent and the displacement of the elements possibly from one class to the other in order to allow a decrease in the global partitioning error, gives the possibility of further improving the situation. Thus a distribution of the technical elements in relatively similar classes is easily obtained.

Alternatively, the installation is able to define for each emission source the emission method. For this purpose, the measured data are pieces of time information characteristic of the emitted signal (frequency, waveform, etc.) from each receiver.

These pieces of information are correlated and grouped together according to the algorithm of the previous embodiment.

For each data class thereby obtained, the emitter is characterized from pieces of time information measured by any suitable known method.

The computing environment included in the information processing unit 14 includes computer programs or code. Computer programs are executed by data processors. Each program may contain a number of modules and whether modularized or not, instructions to be read and executed by a computing environment. Instructions refer to computer-implemented steps for processing information in the system. Instructions can be implemented in software, firmware or hardware and include any type of programmed step undertaken by components of the system.

The computing environment also includes one or more memories. Memory refers to electronic circuitry that allows information, typically computer data, to be stored and retrieved. Memory can refer to external devices or systems, for example, disk drives or tape drives. Memory can also refer to fast semiconductor storage (chips), for example, random access memory (RAM) or various forms of read only memory (ROM) are directly connected to the processor. Other types of memory include flash, RRAM, STTRAM, DRAM, SRAM, hard disk drives, etc. Such computer readable memories are generally non-transitory.

As can be appreciated by one of ordinary skill in the art, each of the modules of the program(s) can include various sub-routines, procedures, definitional statements, and macros. Each of the modules are typically separately compiled and linked into a single executable program. Therefore, any description of modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for characterizing at least one wireless signal source, comprising:
    measuring, from a set of sensors having antennas, a set of technical data specific to the signals emitted by the signal source;
    grouping together the technical data in a set of classes depending on correlations on the data; and
    characterizing the signal source from the technical data having been grouped together;
    wherein the grouping step comprises:
        calculating correlations on data n-tuples with $n>2$;
        calculating a global partitioning error for different distributions of the data in the classes, the global partitioning error being defined as a sum, for all the n-tuples:
            of the partitioning costs of an n-tuple in the same class if all the data of the n-tuple are in the same class, the partitioning cost in the same class being a decreasing function of the correlation of the n-tuple; and
            of the partitioning costs of an n-tuple in different classes when all the data of the n-tuple are not in the same class, the partitioning cost in the different classes being an increasing function of the correlation of the n-tuple; and
        retaining as a grouping of data the distribution in the classes minimizing the global partitioning error.

2. The method according to claim 1, wherein the partitioning cost in the same class is equal to 1 minus the correlation of the n-tuple and wherein the partitioning cost in the different classes is equal to the correlation of the n-tuple.

3. The method according to claim 1, wherein the calculation of the global partitioning error for different distributions includes:
    an initial step for distributing the data in M classes; and
    a step for displacing data among the classes with, for each displacement, the calculation of the global partitioning error.

4. The method according to claim 3, wherein the initial distribution step includes: i) the calculation of a coherence function among the data of a class and ii) the selection, in order to generate a new class, of the data from the set of maximum cardinal and for which the coherence function is greater than a predetermined threshold.

5. The method according to claim 1, wherein the technical data are emission directions of intercepted signals from the signal source and wherein the characterization of the signal source includes a step for estimating the position of the signal source by triangulation of the data of the same class for each of the sources.

6. The method according to claim 1, wherein the technical data are pieces of time information characteristic of the intercepted signals from the signal source and wherein the characterization of the signal source includes a step for estimating the emission method of each of the sources from time information characteristic of the same class for each of the sources.

7. A system for characterizing at least one wireless signal source, comprising:
    means for measuring, from a set of sensors having antennas, a set of technical data specific to the signals emitted by the signal source;
    means for grouping together the technical data in a set of classes depending on the correlations on the data; and
    means for characterizing the signal source from the technical data having been grouped together;
    wherein the grouping means comprises:
        means for calculating correlations on the data n-tuples with $n>2$;
        means for calculating a global partitioning error for different distributions of the data in the classes, the global partitioning error being defined as a sum, for all the n tuples:
            of the partitioning costs of an n-tuple in the same class if all the data of the n-tuple are in the same class, the partitioning cost in the same class being a decreasing function of the correlation of the n-tuple; and
            of the partitioning costs of an n-tuple in different classes when all the data of the n-tuple are not in the same class, the partitioning cost in the different classes being an increasing function of the correlation of the n-tuple; and
        means for retaining as a grouping of data the distribution in the classes minimizing the global partitioning error.

8. A system of characterizing at least one wireless signal source, comprising:
    a computing environment configured to:
    measure, from a set of sensors having antennas, a set of technical data specific to the wireless signals emitted by the wireless signal source;
    group together the technical data in a set of classes depending on the correlations on the data; and
    characterize the wireless signal source from the technical data having been grouped together;
    wherein the grouping comprises:
        calculate correlations on the data n-tuples with $n>2$;
        calculate a global partitioning error for different distributions of the data in the classes, the global partitioning error being defined as a sum, for all the n tuples:
            of the partitioning costs of an n-tuple in the same class if all the data of the n-tuple are in the same class, the partitioning cost in the same class being a decreasing function of the correlation of the n-tuple; and
            of the partitioning costs of an n-tuple in different classes when all the data of the n-tuple are not in the same class, the partitioning cost in the different classes being an increasing function of the correlation of the n-tuple; and
        retain as a grouping of data the distribution in the classes minimizing the global partitioning error.

* * * * *